United States Patent
Tardo

(10) Patent No.: US 9,838,305 B2
(45) Date of Patent: Dec. 5, 2017

(54) METHOD, SYSTEM AND APPARATUS FOR AN OPENFLOW HYBRID ARCHITECTURE NETWORK DEVICE

(71) Applicant: Avago Technologies General IP (Singapore) Pte. Ltd., Singapore (SG)

(72) Inventor: Joseph John Tardo, Palo Alto, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 10 days.

(21) Appl. No.: 14/265,533

(22) Filed: Apr. 30, 2014

(65) Prior Publication Data

US 2015/0016449 A1 Jan. 15, 2015

Related U.S. Application Data

(60) Provisional application No. 61/845,225, filed on Jul. 11, 2013.

(51) Int. Cl.
| | | |
|---|---|---|
| *H04L 12/721* | (2013.01) | |
| *H04L 12/715* | (2013.01) | |
| *H04L 12/823* | (2013.01) | |
| *H04L 29/08* | (2006.01) | |
| *H04L 12/851* | (2013.01) | |

(52) U.S. Cl.
CPC .............. *H04L 45/38* (2013.01); *H04L 45/64* (2013.01); *H04L 47/2483* (2013.01); *H04L 47/32* (2013.01); *H04L 67/10* (2013.01)

(58) Field of Classification Search
CPC ......... H04L 45/32; H04L 45/38; H04L 45/64; H04L 45/2483; H04L 67/00; H04L 47/32; H04L 47/2483; H04L 67/10
See application file for complete search history.

(56) References Cited

U.S. PATENT DOCUMENTS

| | | | |
|---|---|---|---|
| 2013/0176850 A1* | 7/2013 | Mishra | H04L 49/00 370/235 |
| 2013/0318243 A1* | 11/2013 | Chinthalapati | H04L 45/24 709/226 |

OTHER PUBLICATIONS

OpenFlow Switch Specification, Version 1.3.0, Jun. 25, 2012.
Janos Farkas, OF SIN Architectural Example and Questions, Oct. 15, 2012.

* cited by examiner

*Primary Examiner* — Edan Orgad
*Assistant Examiner* — Jeremy Costin
(74) *Attorney, Agent, or Firm* — Foley & Lardner LLP

(57) ABSTRACT

A method, system and apparatus for an OpenFlow hybrid architecture network device. In one embodiment, a hybrid approach is enabled by a network device that brackets an OpenFlow forwarding plane with conventional forwarding planes. Interfaces between the OpenFlow forwarding plane is provided via logical ports that pass packets along with associated metadata.

20 Claims, 5 Drawing Sheets

METHOD, SYSTEM AND APPARATUS FOR AN OPENFLOW HYBRID ARCHITECTURE NETWORK DEVICE

This application claims the benefit of and priority to provisional application No. 61/845,225, filed Jul. 11, 2013, which is incorporated herein by reference in its entirety.

BACKGROUND

Field

The present disclosure relates generally to networking and, more particularly, to method, system and apparatus for an OpenFlow hybrid architecture network device.

Introduction

Increasing demands are being placed upon the data communications infrastructure. These increasing demands are driven by various factors, including the increasing bandwidth requirements of Internet multimedia applications (e.g., distribution of news, financial data, software, video, audio and multi-person conferencing, etc). To accommodate the increasing bandwidth requirements, communication link speeds have also continued to evolve. For example, 10 Gigabit Ethernet (GbE) ports are commonly used for I/O on many of today's network switches.

Management of these data communication networks is becoming increasingly difficult as static, hierarchical network switch architectures have difficulty adapting to the dynamic needs of the data communication network. For example, traffic patterns are increasingly complex as virtualization and cloud computing services continue to grow in application. Moreover, access to these services must also consider the increasing usage of mobile computing devices such as smart phones and tablets. In general, these various factors create an environment where an increasing premium is being placed on effective management of a data communications infrastructure.

BRIEF DESCRIPTION OF THE DRAWINGS

In order to describe the manner in which the above-recited and other advantages and features can be obtained, a more particular description will be rendered by reference to specific embodiments thereof which are illustrated in the appended drawings. Understanding that these drawings depict only typical embodiments and are not therefore to be considered limiting of its scope, the disclosure describes and explains with additional specificity and detail through the use of the accompanying drawings in which.

DETAILED DESCRIPTION

Figure 1:
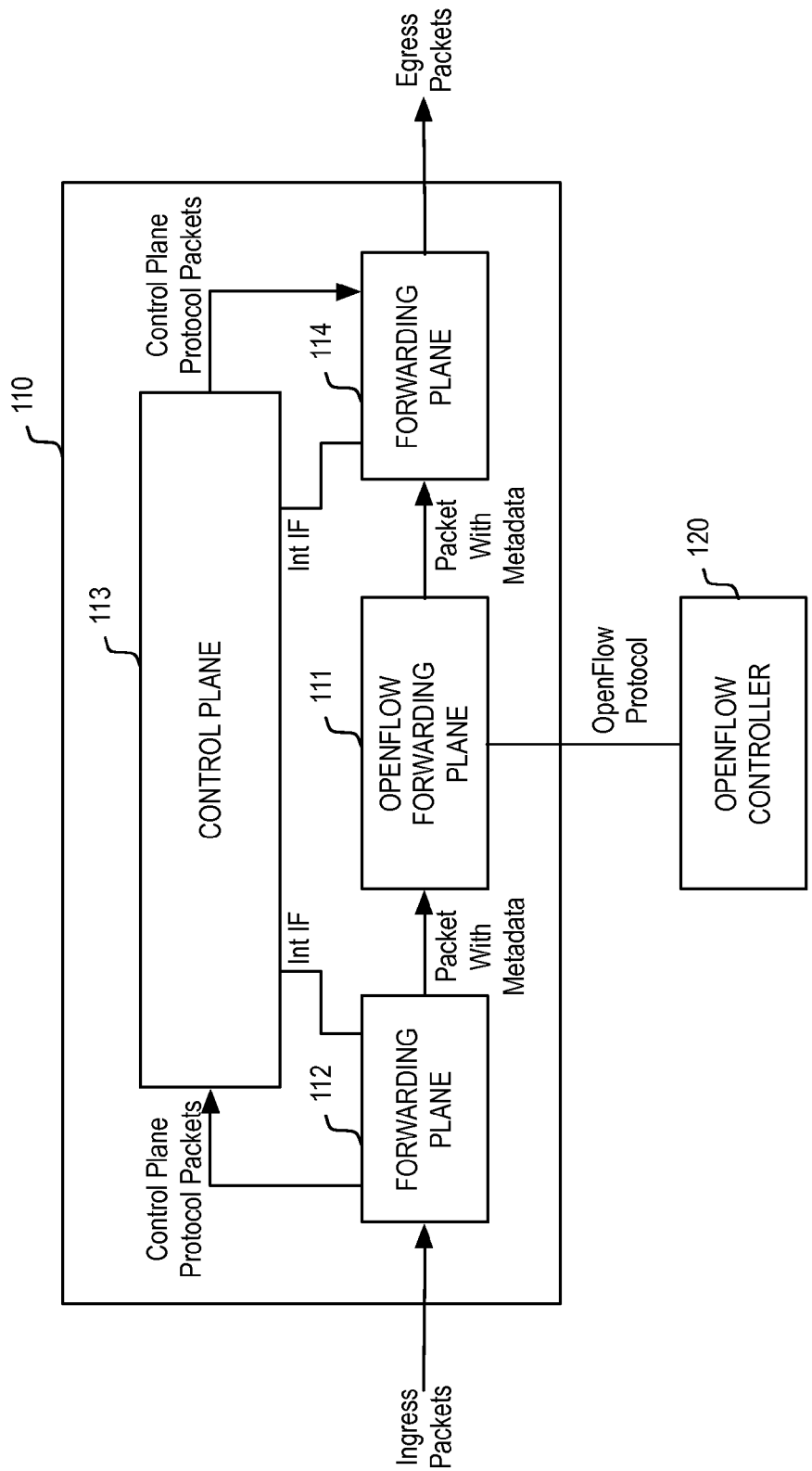
FIG. 1 illustrates an embodiment of a hybrid network device.

Various embodiments are discussed in detail below. While specific implementations are discussed, it should be understood that this is done for illustration purposes only. A person skilled in the relevant art will recognize that other components and configurations may be used without parting from the spirit and scope of the present disclosure.

OpenFlow is an architecture for network devices that separates control and data forwarding planes. The OpenFlow architecture is based on an abstract switch that embodies a forwarding plane, a logically centralized controller that is external from the network device, and a control protocol between the network device and the controller that enables the controller to program the network device. This separation of the control plane from the forwarding plane allows for more sophisticated traffic management than is feasible using access control lists (ACLs) and routing protocols of existing switches. In general, OpenFlow enables software-defined networking (SDN), which is projected to improve on the limitations of existing switches. The OpenFlow architecture is described in greater detail in the Open Network Foundation's OpenFlow Switch Specification, Version 1.3.0.

Notwithstanding the projected benefits of an OpenFlow architecture, the implementation of a pure OpenFlow approach makes it difficult to leverage existing functionality in switches. At best, the OpenFlow controller would need to re-implement the same distributed algorithms that program forwarding tables of existing switches. As would be appreciated, these distributed algorithms have evolved over time to optimize network operation based on particular assumptions. In the present disclosure, it is recognized that a hybrid switch that integrates incumbent conventional networking functionality with OpenFlow would be advantageous.

In one embodiment, a hybrid approach is enabled by a network device that includes a control plane for processing control plane protocol packets, a first forwarding plane, a second forwarding plane and a third forwarding plane. The first forwarding plane is configured for receiving ingress packets on ingress physical ports of the network device. The first forwarding plan is further configured for forwarding control plane protocol packets to the control plane and for transmitting a packet with metadata onto a first logical port. The second forwarding plane can be configured to receive packets with metadata via the first logical port. The second forwarding plane includes a pipeline having one or more processing stages, wherein each of the one or more processing stages perform packet processing in accordance with a respective flow table that includes a plurality of flow entries. Each of the plurality of flow entries are configured to match and process packets and the metadata in accordance with a set of match fields. The second forwarding plane can be connected to an external controller that enables configuration of the flow tables in the one or more processing stages. The third forwarding plane can be configured to receive packets with metadata from the second forwarding plane via a second logical port and to receive control plane packets from the control plane. The third forwarding plane can be further configured to transmit egress packets on egress physical ports of the network device.

In one embodiment, a method performed by a network device includes receiving, by a first forwarding plane, a packet on an ingress physical port of the network device, determining, by the first forwarding plane, whether the received packet is a control plane protocol packet, forwarding, by the first forwarding plane, the received packet to a control plane for processing when it is determined that the received packet is a control plane protocol packet, and forwarding, by the first forwarding plane, the received packet along with metadata to a second forwarding plane via a logical port when it is determined that the received packet is not a control plane protocol packet. The second forwarding plane can include a pipeline having one or more processing stages. Each of the one or more processing stages can perform packet processing in accordance with a respective flow table that includes a plurality of flow entries. Each of the plurality of flow entries can be configured to match and process packets and the metadata in accordance with a set of match fields The second forwarding plane can be coupled to an external controller that enables configuration of the flow tables in the one or more processing stages.

FIG. 1 illustrates an embodiment of a hybrid architecture. As illustrated, network device 110 includes OpenFlow forwarding plane 111, which communicates with external OpenFlow controller 120 using the OpenFlow protocol. As network device 110 includes a hybrid architecture, network device 110 does not consist solely of OpenFlow forwarding plane 111. Rather, the hybrid architecture embodiment of FIG. 1 further includes conventional forwarding plane components that bracket OpenFlow forwarding plane 111. More specifically, OpenFlow forwarding plane 111 is bracketed by forwarding plane 112 that receives ingress packets on physical ports of network device 110, control plane 113 that processes control plane protocol packets, and forwarding plane 114 that transmits egress packets on physical ports of network device 110.

Figure 2:
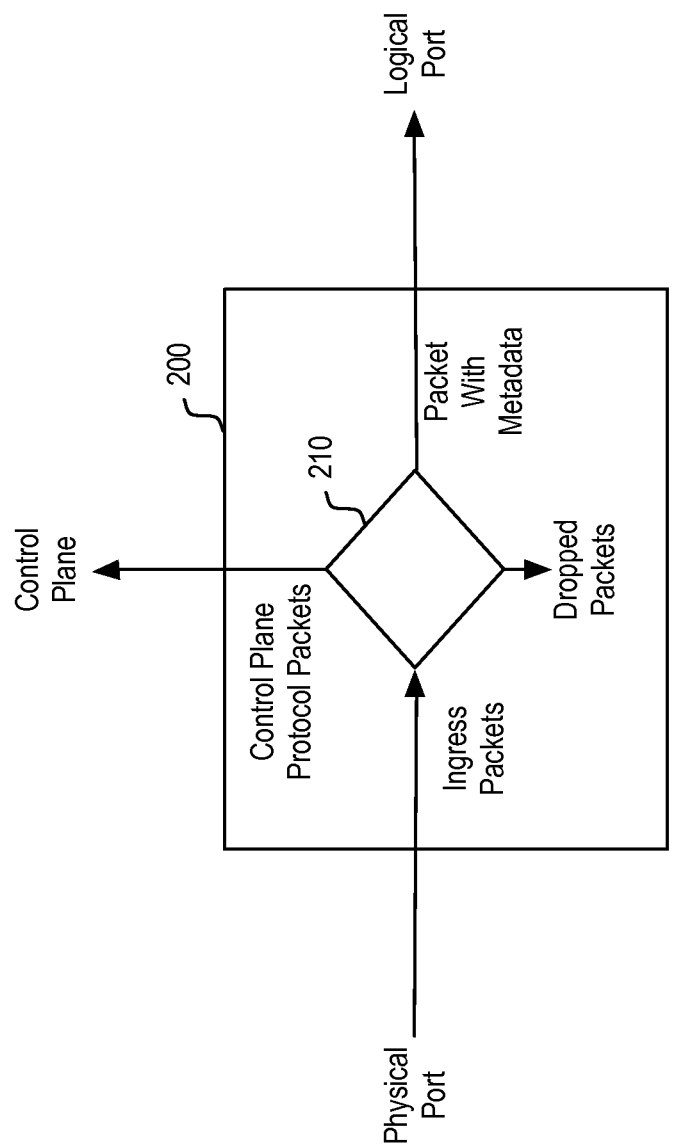
FIG. 2 illustrates an example embodiment of processing by a forwarding plane that receives packets on an ingress side of a network device.

FIG. 2 illustrates an example embodiment of processing by a forwarding plane that receives packets on an ingress side of a network device. As illustrated forwarding plane 200 receives ingress packets on one or more physical ports of a network device. In general, the one or more physical ports are network device defined ports that correspond to a hardware interface of the network device. The ingress packets received on the physical ports are processed in accordance with routing module 210.

One of the functions of routing module 210 is to determine whether the ingress packet is a control plane protocol packet. For example, bridge protocol data units (BPDUs) that ingress for link management functions such as Spanning Tree Protocols (xSTP), Link Layer Discovery Protocol (LLDP), Link Aggregation Control Protocol (LACP), or other control protocols can be identified and processed without intervention or knowledge by OpenFlow forwarding plane 111. As noted, in implementing a hybrid architecture, OpenFlow forwarding plane 111 need not re-implement the same distributed algorithms that program forwarding tables of existing switches. Accordingly, identified control plane protocol packets can be diverted by routing module 210 to control plane 113 for processing by conventional control plane algorithms.

As illustrated in FIG. 1, the processing of control plane protocol packets by control plane 113 can yield packet processing information that is to be passed to forwarding plane 112 via an internal interface (Int IF). For example, processing of an LACP control plane protocol packet by control plane 113 can yield an update on a grouping status of ports. In another example, processing of an xSTP control plane protocol packet by control plane 113 can yield an update to a blocking or unblocking of ports. As illustrated in FIG. 2, a determination of a blocked status for a port can lead routing module 210 to drop ingress packets for that port.

A further function of routing module 210 is to provide a general, well-defined interface between OpenFlow functionality and conventional incumbent networking functionality. It is a feature of the present disclosure that the general, well-defined interface leverages much of the existing networking functionality. As forwarding plane 112 receives all of the ingress packets, the questions relating to hardware portioning between conventional and OpenFlow networking functionality is also removed.

In the present disclosure, forwarding plane 112 passes packets along with associated metadata to OpenFlow forwarding plane 111 via a logical port. In general, a logical port is a network device defined port that does not correspond directly to a hardware interface of the network device. It is recognized that any packet processing performed by forwarding plane 112 prior to OpenFlow forwarding plane 111 receiving the packet and associated metadata from the logical port would be transparent to OpenFlow forwarding plane 111. In other words, OpenFlow forwarding plane 111 processes packets and associated metadata as if the packets and associated data passed through a prior OpenFlow table. In the present disclosure, the metadata is generated through the incorporation of layer processing as part of an additional logical port processing step performed by forwarding plane 112. For example, metadata can be generated through the removal of outer encapsulation headers from an ingress packet.

Figure 3:
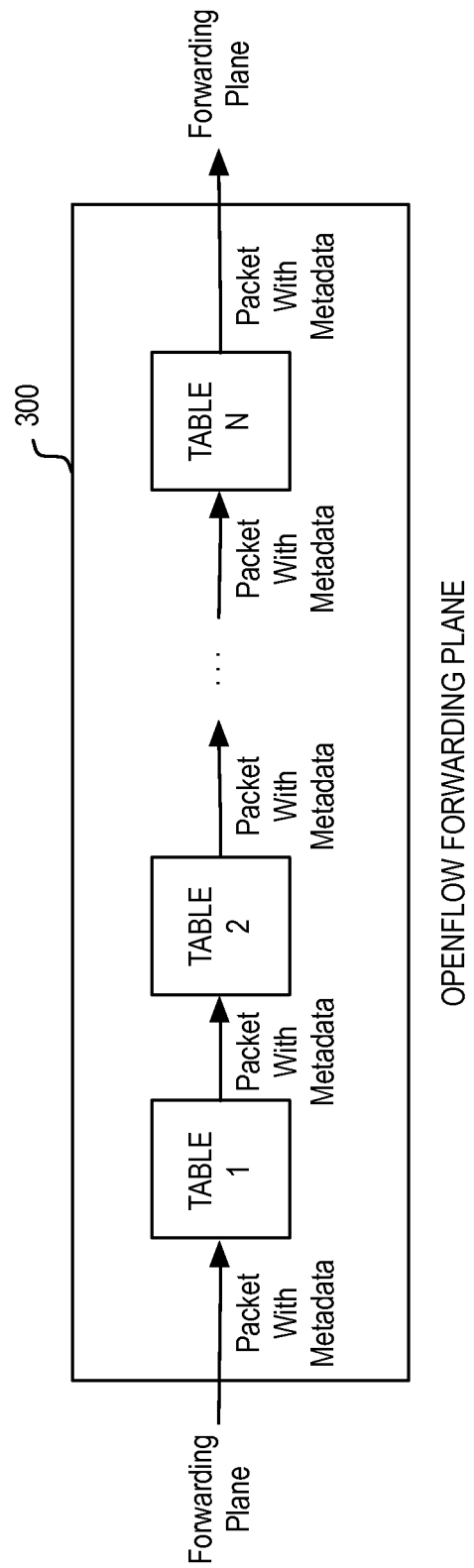
FIG. 3 illustrates an example embodiment of an OpenFlow forwarding plane that processes received packets and metadata using one or more flow tables.

FIG. 3 illustrates an example embodiment of an OpenFlow forwarding plane that processes received packets and metadata using one or more flow tables. As noted above, OpenFlow forwarding plane 300 can be bracketed by conventional forwarding planes. The interface to the conventional forwarding planes is via logical ports. On an ingress side, OpenFlow forwarding plane 300 receives a packet with associated metadata for processing by one or more tables.

In general, OpenFlow forwarding plane 300 includes a set of flow tables that an OpenFlow controller can configure and write entries into using the OpenFlow protocol. The OpenFlow protocol effectively moves the network control out of proprietary network switches and into control software that's open source and locally managed. Each flow table can contain multiple flow entries.

Packets are processed through the packet-processing pipeline of one or more flow tables (Tables 1-N). At each table, the packet and metadata are matched and processed. The metadata can be matched and written at each table and enables the pipeline to carry state between tables. As the packet goes through the packet-processing pipeline, a packet is associated with an action set, which is resolved at the end of the packet-processing pipeline and applied to the packet. The end result of processing by the packet-processing pipeline is a delivery of a packet with associated meta data to a logical port for delivery to a further forwarding plane on an egress side of the network device.

Figure 4:
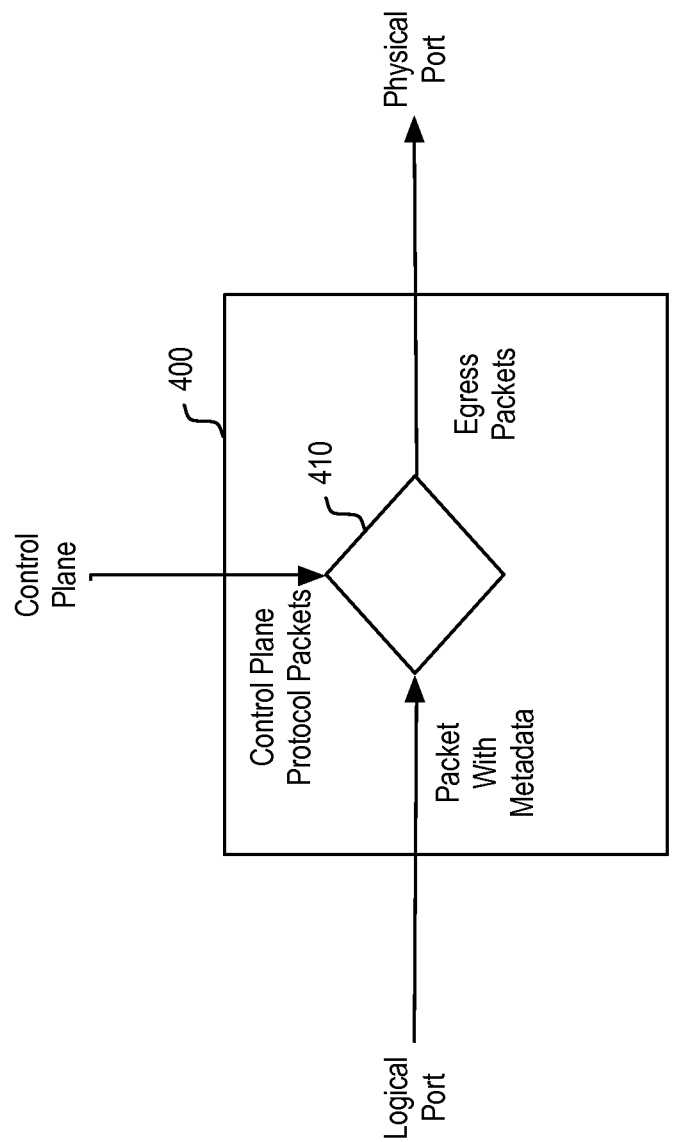
FIG. 4 illustrates an example embodiment of processing by a forwarding plane that transmits packets on an egress side of a network device.

FIG. 4 illustrates an example embodiment of processing by a forwarding plane that transmits packets on an egress side of a network device. As illustrated, forwarding plane 400 receives a packet with associated metadata from the OpenFlow forwarding plane via a logical port. Here again, it should be noted that any processing by forwarding plane 400 would be transparent to the OpenFlow forwarding plane.

Packets along with associated metadata are processed by routing module 410 in forwarding plane 400. The metadata is used by routing module 410 to generate egress packets for transmission by the network device. For example, the metadata can be used to generate encapsulating headers for the egress packet.

As further illustrated, routing module also receives control plane protocol packets from the control plane. Such control plane protocol packets can be generated in accordance with conventional control plane algorithms. It should be noted again that, as illustrated in FIG. 1, the processing of control plane protocol packets by control plane 113 can yield packet processing information that is to be passed to forwarding plane 114 via an internal interface. This packet processing information can be used by routing module 410 in the generation of control plane protocol packets that are generated by routing module 410 for transmission on the physical ports.

As has been described, a hybrid architecture has been provided that enables a smooth integration of OpenFlow functionality with conventional networking functionality in a network device. Such integration has been enabled by the well-defined interfaces that enable the OpenFlow functionality to be bracketed by the conventional network functionality.

Figure 5:
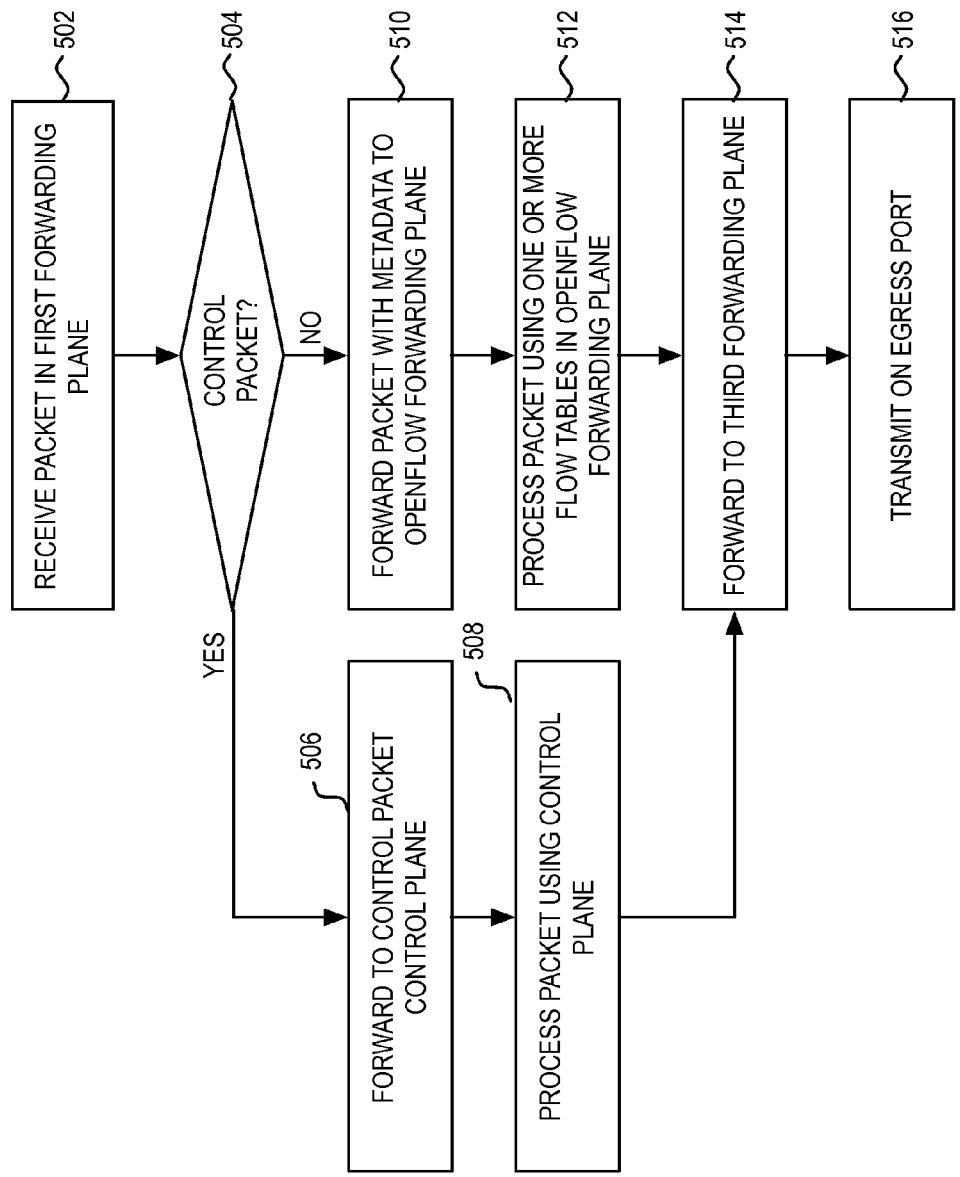
FIG. 5 illustrates a flowchart of an example process.

Having described a general framework of a hybrid architecture, reference is now made to FIG. 5, which illustrates a flowchart of an example process. As illustrated, the process begins at step 502 where a packet is received in a first forwarding plane at an ingress side of the network device. This first forwarding plane can be a conventional network forwarding plane.

At step 504, it is then determined by the first forwarding plane whether the received packet is a control plane protocol packet. If it is determined that the received packet is a control plane protocol packet, then the received packet is forwarded to the control packet control plane at step 506. The control plane can represent a conventional control plane that implements conventional distributed algorithms.

In one embodiment, control plane protocol packets that are processed by the control plane at step 508 are forwarded, at step 514, to a third forwarding plane at an egress side of the network device. Like the first forwarding plane, the third forwarding plane can also be a conventional network forwarding plane. The control plane protocol packets can then be processed and transmitted by the third forwarding plane onto a physical port of the network device at step 516.

Alternatively, if it is determined that the packet received by the first forwarding plane is not a control packet, then the process continues to step 510 where the packet and generated metadata is forwarded by the first forwarding plane to the OpenFlow forwarding plane via a logical port. The usage of a logical port as an interface between the first forwarding plane and the OpenFlow forwarding plane enables the processing by the first forwarding plane to be transparent from the OpenFlow forwarding plane. As noted, from the perspective of the first table in the OpenFlow forwarding plane, the packet with metadata were produced through the processing of a previous OpenFlow table.

The packet with associated metadata that are received over the logical port are processed by one or more tables at step 512. After an action set has been applied, the processed packet and associated metadata are forwarded, at step 514, to the third forwarding plane via a logical port. Again, the usage of a logical port as an interface between the OpenFlow forwarding plane and the third forwarding plane enables the processing by the third forwarding plane to be transparent from the OpenFlow forwarding plane. Finally, at step 516, the packet generated using the packet and associated metadata received over the logical port is then transmitted on the physical egress port.

Another embodiment of the present disclosure can provide a machine and/or computer readable storage and/or medium, having stored thereon, a machine code and/or a computer program having at least one code section executable by a machine and/or a computer, thereby causing the machine and/or computer to perform the steps as described herein.

Those of skill in the relevant art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Those of skill in the relevant art can implement the described functionality in varying ways for each particular application. Various components and blocks may be arranged differently (e.g., arranged in a different order, or partitioned in a different way) all without departing from the scope of the subject technology.

These and other aspects of the present disclosure will become apparent to those skilled in the relevant art by a review of the preceding detailed disclosure. Although a number of salient features of the present disclosure have been described above, the principles in the present disclosure are capable of other embodiments and of being practiced and carried out in various ways that would be apparent to one of skill in the relevant art after reading the present disclosure, therefore the above disclosure should not be considered to be exclusive of these other embodiments. Also, it is to be understood that the phraseology and terminology employed herein are for the purposes of description and should not be regarded as limiting.

What is claimed is:

1. A network device, comprising:
   one or more ingress physical ports;
   one or more egress physical ports;
   a first non-OpenFlow forwarding plane configured to receive ingress packets via the one or more ingress physical ports,
      the first non-OpenFlow forwarding plane interfacing with an OpenFlow forwarding plane via a first logical port and interfacing with a control plane via a first interface, wherein the first logical port is a defined port of the network device,
      the OpenFlow forwarding plane coupled between the first non-OpenFlow forwarding plane and a second non-OpenFlow forwarding plane, the OpenFlow forwarding plane interfacing with the first non-OpenFlow forwarding plane via the first logical port and interfacing with the second non-OpenFlow forwarding plane via a second logical port, the OpenFlow forwarding plane not interfacing with the control plane, and
      the second non-OpenFlow forwarding plane interfacing with the OpenFlow forwarding plane via the second logical port and interfacing with the control plane via a second interface,
      wherein the first non-OpenFlow forwarding plane is configured to forward control plane protocol packets to the control plane and to receive packet processing information via the first interface from the control plane, and the first non-OpenFlow forwarding plane further configured to generate metadata and to transmit packets with the metadata to the OpenFlow forwarding plane via the first logical port;
   the control plane configured to process the control plane protocol packets received from the first non-OpenFlow forwarding plane, generate the packet processing information as a result of processing the control plane protocol packets, and transmit the packet processing information to the first non-OpenFlow forwarding plane via the first interface and to the second non-OpenFlow forwarding plane via the second interface;

the OpenFlow forwarding plane configured to receive the packets with the metadata via the first logical port, the OpenFlow forwarding plane including a pipeline having a plurality of processing stages, each of the plurality of processing stages performing packet processing in accordance with a respective flow table that includes a plurality of flow entries, each of the plurality of flow entries being configured to match and process the packets with the metadata in accordance with a set of match fields, the OpenFlow forwarding plane being connected to an external controller that enables configuration of the flow tables in the plurality of processing stages; and the second non-OpenFlow forwarding plane configured to receive the processed packets with the metadata from the OpenFlow forwarding plane via the second logical port and to receive from the control plane the processed control plane protocol packets and the packet processing information via the second interface, the second non-OpenFlow forwarding plane further configured to transmit egress packets via the one or more egress physical ports.

2. The network device of claim 1, wherein the control plane protocol packets perform link management functions.

3. The network device of claim 1, wherein the control plane only interfaces with the first non-OpenFlow forwarding plane and the second non-OpenFlow forwarding plane and does not interface with the OpenFlow forwarding plane.

4. The network device of claim 1, wherein the first non-OpenFlow forwarding plane does not comprise any flow table.

5. The network device of claim 1, wherein the OpenFlow forwarding plane does not forward packets to the control plane.

6. The network device of claim 1, wherein the OpenFlow forwarding plane does not receive packets from the control plane.

7. The network device of claim 1, wherein the OpenFlow forwarding plane does not communicate packets with the control plane.

8. The network device of claim 1, wherein the external controller is connected to the OpenFlow forwarding plane, is not connected to the first non-OpenFlow forwarding plane, and is not connected to the second non-OpenFlow forwarding plane.

9. The network device of claim 1, wherein the external controller is not connected to the first non-OpenFlow forwarding plane and is not connected to the second non-OpenFlow forwarding plane.

10. A method performed by a network device, comprising:
receiving, by a first non-OpenFlow forwarding plane, a packet via an ingress physical port of the network device;
determining, by the first non-OpenFlow forwarding plane, whether the received packet is a control plane protocol packet;
forwarding, by the first non-OpenFlow forwarding plane, the received packet to a control plane for processing in response to determining that the received packet is the control plane protocol packet, wherein the control plane processes the control plane protocol packet, generates packet processing information as a result of processing the control plane protocol packet, and transmits the packet processing information to the first non-OpenFlow forwarding plane via a first interface and to a second non-OpenFlow forwarding plane via a second interface; and forwarding, by the first non-OpenFlow forwarding plane, the received packet along with metadata to an OpenFlow forwarding plane via a first logical port in response to determining that the received packet is not the control plane protocol packet, wherein the metadata is generated by the first non-OpenFlow forwarding plane, and wherein the first logical port is a defined port of the network device, wherein the OpenFlow forwarding plane includes a pipeline having a plurality of processing stages, each of the plurality of processing stages performing packet processing in accordance with a respective flow table that includes a plurality of flow entries, each of the plurality of flow entries being configured to match and process the packets and the metadata in accordance with a set of match fields, the OpenFlow forwarding plane being coupled to an external controller that enables configuration of the flow tables in the plurality of processing stages, and wherein the OpenFlow forwarding plane is coupled between the first non-OpenFlow forwarding plane and the second non-OpenFlow forwarding plane without interfacing to the control plane, the OpenFlow forwarding plane interfacing with the first non-OpenFlow forwarding plane via the first logical port and interfacing with the second non-OpenFlow forwarding plane via a second logical port.

11. The method of claim 10, further comprising forwarding, by the OpenFlow forwarding plane, the processed packet along with the metadata to the second non-OpenFlow forwarding plane via the second logical port, the second non-OpenFlow forwarding plane being configured to transmit egress packets on egress physical ports of the network device.

12. The method of claim 11, further comprising receiving, by the second non-OpenFlow forwarding plane, the control plane protocol packet that has been processed by the control plane and the packet processing information via the second interface.

13. The method of claim 11, wherein the control plane only interfaces with the first non-OpenFlow forwarding plane and the second non-OpenFlow forwarding plane and does not interface with the OpenFlow forwarding plane.

14. The method of claim 11, wherein the first non-OpenFlow forwarding plane does not comprise any flow table.

15. The method of claim 11, wherein the OpenFlow forwarding plane does not communicate packets with the control plane.

16. The method of claim 10, wherein the control plane protocol packet performs link management functions.

17. A system comprising:
a processor; and
a memory coupled to the processor, the memory storing computer-executable instructions that when executed by the processor, cause the processor to perform operations comprising:
receiving, by a first non-OpenFlow forwarding plane, a packet via an ingress physical port of the network device;
forwarding, by the first non-OpenFlow forwarding plane, the received packet to a control plane for processing when the received packet is a control plane protocol packet, wherein the control plane processes the control plane protocol packet, generates packet processing information as a result of processing the control plane protocol packet, and transmits the packet processing information to the first non-OpenFlow forwarding plane via a first interface and to a second non-OpenFlow forwarding plane via a second interface; and forwarding, by the first non-OpenFlow forwarding plane, the received packet along with metadata to an OpenFlow forwarding plane via a first logical port when the received packet is not the control plane protocol packet, wherein the metadata is generated by the first non-OpenFlow forwarding plane, and wherein the first logical port is a defined port of the network device, wherein the OpenFlow forwarding plane includes a pipeline having a plurality of processing stages, each of the plurality of processing stages performing packet processing in accordance with a respective flow table that includes a plurality of flow entries, each of the plurality of flow entries being configured to match and process the packet and the metadata in accordance with a set of match fields, the OpenFlow forwarding plane being coupled to an external controller that enables configuration of the flow tables in the plurality of processing stages, wherein the OpenFlow forwarding plane is coupled between the first non-OpenFlow forwarding plane and the second non-OpenFlow forwarding plane without interfacing to the control plane, the OpenFlow forwarding plane interfacing with the first non-OpenFlow forwarding plane via the first logical port and interfacing with the second non-OpenFlow forwarding plane via a second logical port.

18. The system of claim 17, wherein the memory stores the computer-executable instructions that when executed by the processor, further cause the processor to perform operations comprising forwarding, by the OpenFlow forwarding plane, the processed packet along with the metadata to the second non-OpenFlow forwarding plane via the second logical port, the second non-OpenFlow forwarding plane configured to transmit egress packets on egress physical ports of the network device.

19. The system of claim 17, wherein the control plane only interfaces with the first non-OpenFlow forwarding plane and the second non-OpenFlow forwarding plane and does not interface with the OpenFlow forwarding plane.

20. The system of claim 17, wherein the first non-OpenFlow forwarding plane does not comprise any flow table.

* * * * *